US009911250B2

(12) United States Patent
Steinlechner et al.

(10) Patent No.: US 9,911,250 B2
(45) Date of Patent: Mar. 6, 2018

(54) SENSOR UNIT FOR A VEHICLE (71) Applicant: Robert Bosch GmbH, Stuttgart (DE)

(72) Inventors: Siegbert Steinlechner, Leonberg (DE); Jan Scheuing, Brackenheim (DE); Christoph Schroeder, Pleidelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/899,649

(22) PCT Filed: Jun. 11, 2014

(86) PCT No.: PCT/EP2014/062143
§ 371 (c)(1),
(2) Date: Dec. 18, 2015

(87) PCT Pub. No.: WO2014/202443
PCT Pub. Date: Dec. 24, 2014

(65) Prior Publication Data
US 2016/0163131 A1 Jun. 9, 2016

(30) Foreign Application Priority Data
Jun. 20, 2013 (DE) .................. 10 2013 211 697

(51) Int. Cl.
*G07C 5/00* (2006.01)
*G07C 5/08* (2006.01)
(Continued)

(52) U.S. Cl.
CPC .............. *G07C 5/0808* (2013.01); *B60C 9/00* (2013.01); *G01M 17/013* (2013.01)

(58) Field of Classification Search
None
See application file for complete search history.

(56) References Cited

U.S. PATENT DOCUMENTS

2005/0083186 A1* 4/2005 Hayes ................... B60B 3/08
340/438
2007/0299573 A1* 12/2007 Carlstrom ............... B60T 8/885
701/31.4

(Continued)

FOREIGN PATENT DOCUMENTS

| EP | 1 308 320 A2 | 5/2003 |
| JP | 2008-157663 A | 7/2008 |
| WO | 2009/070065 A1 | 6/2009 |

*Primary Examiner* — James M McPherson
(74) *Attorney, Agent, or Firm* — Maginot, Moore & Beck LLP (57) ABSTRACT The disclosure relates to a sensor arrangement for a vehicle having at least one rotation-speed detection apparatus, which continuously detects a state variable and outputs said state variable to an evaluation and control unit which receives and evaluates signals which are output by a rotation-speed detection apparatus, wherein the evaluation and control unit carries out a first evaluation process with the detected state variable and ascertains a rotation speed of at least one vehicle wheel, the rim of said vehicle wheel being fastened to a corresponding wheel hub by means of wheel fastening means. According to the disclosure, the evaluation and control unit carries out a second evaluation process and identifies and monitors, on the basis of the continuously detected state variable, mechanical play between the vehicle wheel and the corresponding wheel hub in order to detect detached wheel fastening means.

20 Claims, 6 Drawing Sheets (51) Int. Cl.
*G01M 17/013* (2006.01)
*B60C 9/00* (2006.01)

(56) References Cited

U.S. PATENT DOCUMENTS

| | | | | |
|---|---|---|---|---|
| 2009/0207008 A1* | 8/2009 | Malis | ................ | B60B 3/16 340/438 |
| 2013/0049952 A1* | 2/2013 | Schnare | ................ | G01B 7/003 340/539.1 |
| 2014/0309860 A1* | 10/2014 | Paulin | ................ | B60B 3/165 701/36 |

* cited by examiner

SENSOR UNIT FOR A VEHICLE

This application is a 35 U.S.C. § 371 National Stage Application of PCT/EP2014/062143, filed on Jun. 11, 2014, which claims the benefit of priority to Serial No. DE 10 2013 211 697.7, filed on Jun. 20, 2013 in Germany, the disclosures of which are incorporated herein by reference in their entirety.

BACKGROUND

The disclosure is based on a sensor unit for a vehicle.

Generally, wheel bolts are tightened by way of example while changing tires in a workshop and after an initial period of use (typically 80 km is recommended) it is necessary for the driver to further tighten said wheel bolts. This inspection is however often omitted by the driver. Should the wheel bolts become detached whilst driving, this can lead to significant accidents and great personal injury and material damage. Hereinunder, the term "wheel bolt" is used as a fastening element of the wheel rim so that embodiments of the present disclosure can likewise be used if the fastening function is provided by means of a wheel stud and the associated wheel nut.

Sensors for detecting a wheel rotational speed and/or for detecting a tire pressure in the region of the vehicle wheels are known from the prior art. Systems that identify loosened wheel bolts in the normal driving operation of the vehicle are not known.

JP 2008157663 A discloses a device that determines the wheel rotational speed by way of an electromagnetic rotational speed sensor. In addition, a vibration sensor for detecting vibrations and a temperature sensor for detecting temperature are used in the corresponding wheel bearing. Possible abnormalities in the rotational speed sensor or in a sensor cable or in the wheel bearing are identified by way of a further device.

SUMMARY

In contrast, the sensor arrangement in accordance with the disclosure for a vehicle has the advantage that it is possible based upon the measured data of a rotational speed sensor to identify in the normal driving operation of the vehicle that wheel bolts have become loose. This means that loosened wheel fastening means can be continuously identified at a vehicle wheel in the normal driving operation and without additional sensors if devices for detecting the rotational speed of the vehicle wheel are already installed. Embodiments of the sensor arrangement in accordance with the disclosure for a vehicle are preferably installed so as to determine the wheel rotational speed and so as to monitor the wheel fastening arrangement so that loosened wheel fastening means can be identified at a vehicle wheel or at multiple vehicle wheels in an advantageous manner and a corresponding error state can be output to and displayed on a corresponding display unit. The rotational speed detecting device can be embodied by way of example as a magnetic or optical rotational speed detecting device.

The fundamental advantage of the disclosure is that it is possible to continuously monitor the wheel fastening means in the normal driving operation and said monitoring process is possible without additional external sensors. ABS sensors (ABS: Antilock Braking System) that are embodied as rotational speed detecting devices are already used in the vehicle and are widespread. It is possible at an early stage to detect a loosening of the wheel bolt and to output a corresponding warning signal in a timely manner by means of continuously processing signals and evaluating the available measuring results.

The rotational speed detecting devices that are required in order to use the ABS functionality in the motor vehicle, said rotational speed detecting devices generally being attached to each vehicle wheel, measure the individual rotational speed of each vehicle wheel by way of example by way of a magnetic multipole disc, which comprises a predetermined number of pole regions, and a magnetic field sensor. The magnetic multipole disc is preferably installed in the wheel on the wheel bearing and is fixedly connected to the wheel. Alternatively, toothed discs or perforated discs can also be installed. The magnetic field sensor is fixedly attached on the vehicle on the other side of the rotational axis, said magnetic field sensor can be embodied by way of example as a Hall sensor or GMR sensor. A period of time is measured by way of the magnetic field sensor, said period of time being necessary for the multipole disc to further rotate about a predetermined angular position. The measurement of the movement of the multipole disc is preferably performed by way of a measurement of the change in the magnetic field.

Embodiments of the present disclosure provide a sensor arrangement for a vehicle having at least one rotational speed detecting device and said sensor arrangement continuously detects at least one state variable and outputs said state variable to at least one evaluating and control unit that receives and evaluates signals that are output by at least one rotational speed detecting device. The at least one evaluating and control unit performs a first evaluating process using the at least one state variable that is detected and determines a rotational speed of at least one vehicle wheel whose wheel rim is fastened to a corresponding wheel hub by way of wheel fastening means. In accordance with the disclosure, the at least one evaluating and control unit performs a second evaluating process and based upon the continuously detected at least one state variable S identifies and monitors a mechanical play between the at least one vehicle wheel and the corresponding wheel hub so as to detect loosened wheel fastening means.

An evaluating and control unit can be provided for each vehicle wheel and said evaluating and control unit forms an assembly with a corresponding sensor. Alternatively, a common evaluating and control unit can receive and evaluate the state variables that are detected by way of a corresponding sensor for each wheel. This renders it possible for loosened wheel fastening means to be evaluated and identified from a central point.

It is particularly advantageous that each rotational speed detecting device comprises an encoder disc having a predetermined number of encoding regions and an allocated sensor. Each encoding region generates in the allocated sensor a measuring pulse of the detected state variable, said measuring pulse having a predetermined individual pulse duration, wherein in the second evaluating process the at least one evaluating and control unit determines the individual pulse duration for each encoding region. The encoder disc or the sensor is connected to the vehicle wheel. It is preferred that an encoder disc is in each case fixedly connected to a vehicle wheel and a corresponding sensor is arranged fixed to the vehicle body.

In an advantageous embodiment of the sensor arrangement in accordance with the disclosure, in the second evaluating process the at least one evaluating and control unit can calculate a mean pulse duration over a wheel rotation as a quotient derived from the sum of the detected individual pulse durations of the encoding regions that are present on the encoder disc and the number of the encoding regions that are present.

Generally, the encoder disc cannot be perfectly produced. As a result of the tolerances that occur, such as pitch error of the encoding regions, the measured pulse durations relating to a mean pulse duration that is dependent upon the rotational speed are not identical even in the case of an ideal state, in other words in the case of a fixedly bolted, balanced wheel but are fixedly predetermined for each encoding region. As a result of wheel bolts becoming loose, a play occurs between the wheel and the wheel hub. As a result, small vibrations typically occur in the wheel suspension and also slippage occurs between the wheel and wheel hub in load changing situations. The two effects are evident in the measured data of the sensors.

The vibration effect generates an additional periodic variation of the individual pulse durations. The frequency of this variation corresponds typically to an integer multiple of the wheel rotational speed or rather wheel frequency multiplied by the number of wheel bolts. In load changing situations, in other words during the transition from an accelerating phase into a braking or rather motor braking phase or vice versa, slippage typically occurs between the wheel or rather the wheel rim and the wheel hub in the case of loosened wheel fastening means. This slippage is dependent upon the mechanical play between a wheel fastening means and its through-going opening in the wheel rim. In the case of a given bolt hole radius, the theoretically possible slippage angle can be calculated in radians as a quotient. Typical values for the slippage angle lie in the range of 1 to 1.5 mm. The bolt hole radius has a value of approximately 50 mm dependent upon the vehicle. Consequently, slippage angles in the range of approximately 1° are to be expected.

In a further advantageous embodiment of the sensor arrangement in accordance with the disclosure, in the second evaluating process the at least one evaluating and control unit can determine a periodic variation of the individual pulse durations over the rotational speed of the wheel. It is preferred that in the second evaluating process the at least one evaluating and control unit performs a transformation of the periodic variation into the frequency domain by means of filtering and/or Fourier transformation. The transition into the frequency domain renders it possible in an advantageous manner to evaluate the frequency dependent variation of the individual pulse duration in a simple and rapid manner.

In a further advantageous embodiment of the sensor arrangement in accordance with the disclosure, during the frequency analysis the at least one evaluating and control unit determines amplitudes of spectral lines of the frequency spectrum of the periodic variation of the individual pulse duration, the frequency of said spectral lines corresponding to an integer multiple of the wheel rotational speed multiplied by the number of wheel fastening means. It is preferred that the evaluating and control unit compares the determined amplitudes of the spectral lines with predetermined threshold values and identifies loosened wheel fastening means at the corresponding vehicle wheel if the determined amplitudes of the spectral lines achieve and/or exceed the predetermined threshold value.

In a further advantageous embodiment of the sensor arrangement in accordance with the disclosure, the evaluating and control unit can determine a slippage angle of slippage that occurs in load changing situations between the at least one vehicle wheel and the corresponding wheel hub as a short term sum from a difference of an instantaneous wheel rotational speed that can be calculated from the individual pulse duration, and a mean wheel rotational speed that can be determined from the mean pulse duration and/or from the short term sum by way of the variation and can evaluate the mechanical play between the at least one vehicle wheel and the corresponding wheel hub. It is preferred that the at least one evaluating and control unit identifies loosened wheel fastening means at the corresponding vehicle wheel if the value of the calculated slippage angle achieves a predetermined threshold value of by way of example 1° and/or is in a predetermined tolerance range of by way of example ±0.2° around this threshold value.

In a further advantageous embodiment of the sensor arrangement in accordance with the disclosure, the at least one evaluating and control unit can indicate loosened wheel fastening means by means of an optical and/or acoustic warning signal wheel fastening means.

An exemplary embodiment of the disclosure is illustrated in the drawings and is further explained in the description hereinunder. In the drawings, identical reference numerals describe components or rather elements that perform the same or rather similar functions.

DETAILED DESCRIPTION

As is evident from FIGS. 1 to 5, the illustrated exemplary embodiment of a sensor arrangement in accordance with the disclosure for a vehicle 1 comprises multiple rotational speed detecting devices 20, 22, 24, 26, 28 that are embodied in the illustrated exemplary embodiment as magnetic rotational speed detecting devices 20, 22, 24, 26, 28 and that continuously detect at least one state variable S of a magnetic field M and output said state variable to an evaluating and control unit 10 that is arranged centrally within the vehicle 1. As is further evident in FIGS. 2 and 3, alternatively each rotational speed detecting device 20 can be allocated an evaluating and control unit 100. The at least one evaluating and control unit 10, 100 receives signals from at least one rotational speed detecting device 20, 22, 24, 26, 28 and evaluates said signals. In a first evaluating process 12, the at least one evaluating and control unit 10, 100 determines a rotational speed w of at least one vehicle wheel 30 whose wheel rim 32 is fastened by way of wheel fastening means 34 to a corresponding wheel hub 52. In accordance with the disclosure, the at least one evaluating and control unit 10, 100 performs a second evaluating process 14 and based upon the continuously detected at least one state variable S identifies and monitors a mechanical play between the at least one vehicle wheel 30 and the corresponding wheel hub 52 so as to detect loosened wheel fastening means 34. The at least one evaluating and control unit 10, 100 indicates loosened wheel fastening means 34 by means of an optical and/or acoustic warning signal that is output by way of outputting means, not illustrated, that comprise by way of example warning lamps, loud speakers etc.

Figure 1:
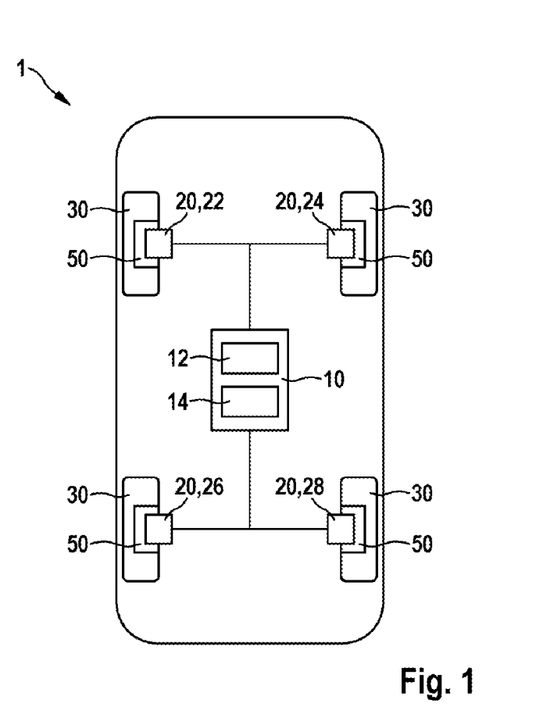
FIG. 1 illustrates a schematic block diagram of an exemplary embodiment of a sensor arrangement in accordance with the disclosure for a vehicle.
Figure 2:
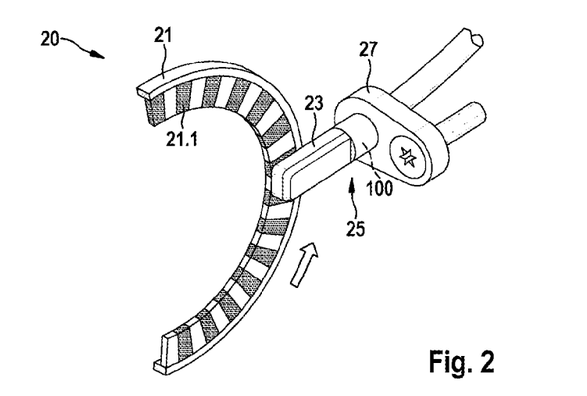
FIG. 2 illustrates a schematic perspective illustration of a rotational speed detecting device for the sensor arrangement in accordance with the disclosure for a vehicle from FIG. 1.
Figure 3:
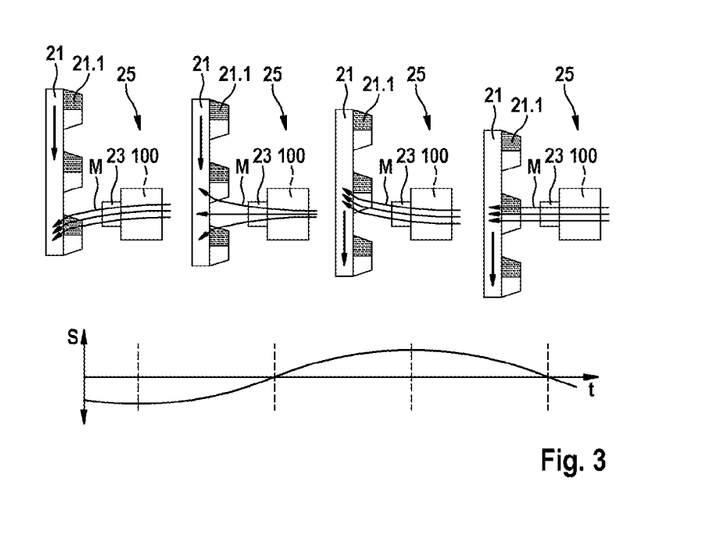
FIG. 3 illustrates a schematic illustration of the connection between the movement of a multipole disc and a measurement of the change in the magnetic field.

As is further evident in FIGS. 2 and 3, each rotational speed detecting device 20, 22, 24, 26, 28 comprises an encoder disc that is preferably embodied as a magnetic encoder disc or rather multipole disc 21 having a predetermined number N of pole regions 21.1, and an allocated sensor that is embodied as a magnetic field sensor 23. Each pole region 21.1 generates in the allocated magnetic field sensor 23 a measuring pulse of the detected state variable S, said measuring pulse having a predetermined individual pulse duration $\Delta t_i$, wherein in the second evaluating process 14 the at least one evaluating and control unit 10, 100 determines the individual pulse duration $\Delta t_i$ for each pole region 21.1, wherein the multipole disc 21 or the magnetic field sensor 23 is connected to the vehicle wheel 30 that is mounted in a rotatable manner. In the illustrated exemplary embodiment, a multipole disc 21 is fixedly connected in each case to a vehicle wheel 30, and a corresponding magnetic field sensor 23 is arranged fixed to the vehicle body. When an evaluating and control unit 100 is used in each case for each vehicle wheel 30, the evaluating and control units 100 form in each case with a corresponding magnetic field sensor 23 preferably a sensor unit 25 that is arranged in a common housing 27.

The rotational speed detecting devices 20, 22, 24, 26, that are arranged in the motor vehicle at each vehicle wheel 30 so as to use the ABS functionality measure the individual rotational speed of each vehicle wheel 30. For this purpose, the magnetic field sensor 23 that is attached to the vehicle, said magnetic field sensor being embodied by way of example as a Hall sensor or GMR sensor (Giant Magneto Resistance), measures a period of time that is necessary for the multipole disc that is arranged on the wheel to further rotate about a predetermined angular position. The measurement of the movement of the multipole disc 21 is performed by way of a measurement of the change in the magnetic field M, whose field lines are schematically illustrated in FIG. 3. The signal curve that is illustrated in FIG. 3 for the detected state variable S of the magnetic field M occurs in dependence upon the position of the multipole disc 21 in relation to the magnetic field sensor 23. A magnetic field strength B is preferably measured as a state variable S. The predetermined angular position corresponds to the dimensions of the individual pole regions 21.1 and the period of time corresponds to the above mentioned individual pulse duration $\Delta t_i$.

Generally, the multipole disc 21 cannot be perfectly produced. As a result of the tolerances that occur, pole region pitch errors and the measured individual pulse durations $\Delta t_i$ occur tooth durations related to a mean pulse duration $\Delta t_{mean}$ that is dependent upon the rotational speed are not identical even in the case of an ideal state, in other words, fixedly bolted, balanced vehicle wheel 30. However, the individual pulse duration $\Delta t_i$ is fixed predetermined for each pole region 21.1. A mechanical play occurs between the wheel rim 32 or rather the vehicle wheel 30 and the wheel hub 52 as a result of wheel fastening means 34 becoming loose. As a result, small vibrations typically occur in the wheel suspension, and also slippage $d_S$ occurs between the wheel rim 32 or rather the vehicle wheel 30 and the wheel hub 52 in load changing situations. The two effects are evident in the measurement data of the magnetic field sensors 23.

The vibration effect generates an additional periodic variation $\epsilon_i$ of the individual pulse duration $\Delta t_i$. The frequency of this variation $\epsilon_i$ typically corresponds to an integer multiple of the rotational speed ω of the corresponding vehicle wheel 30 that is multiplied by the number N of wheel fastening means 34. The at least one evaluating and control unit 10, 100 determines the individual pulse duration $\Delta t_i$ by way of example by way of the points in time of the zero crossings of the state variable S.

FIGS. 6 to 9 illustrate different frequency spectrums of this variation $\epsilon_i$. The frequency lines in accordance with a discrete Fourier transformation of the variation $\epsilon$ over an entire wheel rotation are illustrated. For this purpose, in the second evaluating process the at least one evaluating and control unit 10, 100 forms for each pole region 21.1 the individual periodic variation $\epsilon_i$ as a wheel rotational speed-dependent ratio of an individual, measured pulse duration $\Delta t_i$ and a mean pulse duration $\Delta t_{mean}$ minus a constant having the value 1 in accordance with equation (1).

$$\varepsilon_i = \frac{\Delta t_i}{\Delta t_{mean}} - 1 \quad (1)$$

In the second evaluating process 14, the at least one evaluating and control unit 10, 100 calculates the mean pulse duration $\Delta t_{Mean}$ over a wheel rotation as a quotient derived from the sum of the detected individual pulse durations $\Delta t_i$ of the pole regions 21.1 that are provided on the multipole disc 21 and the number N of the provided pole regions 21.1 in accordance with equation (2).

$$\Delta t_{Mean} = \frac{1}{N} \sum_{k=0}^{N-1} \Delta t_{i-k} \quad (2)$$

As an alternative to the Fourier transformation, the at least one evaluating and control unit 10, 100 can transform the periodic variation $\epsilon_i$ in the second evaluating process 14 by means of filtering into the frequency domain.

Figure 6:
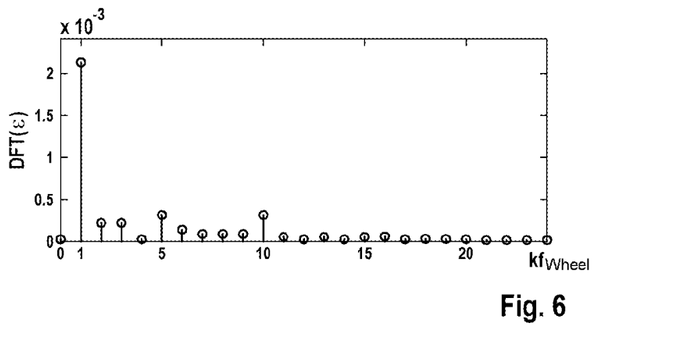
FIG. 6 illustrates a schematic illustration of a first pole region spectrum that was determined using the sensor arrangement in accordance with the disclosure from FIG. 1 at a vehicle wheel having five fixed wheel fastening means.
Figure 7:
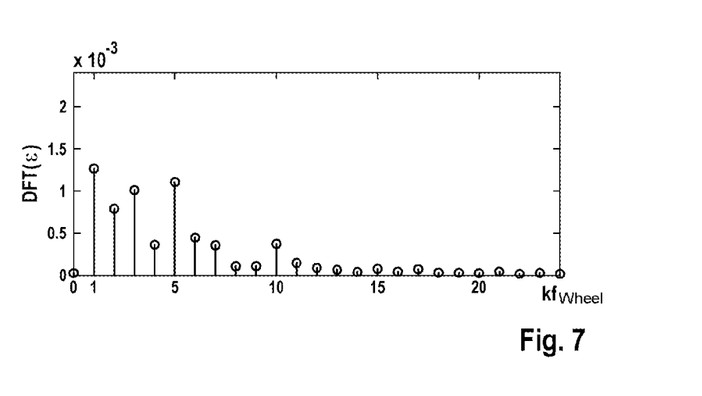
FIG. 7 illustrates a schematic illustration of a second pole region spectrum that was determined using the sensor arrangement in accordance with the disclosure from FIG. 1 at a vehicle wheel having five loosened wheel fastening means.

FIG. 6 illustrates in an exemplary manner a first pole region spectrum that was determined using the sensor arrangement in accordance with the disclosure at a vehicle wheel 30 having five fixed wheel fastening means 34. FIG. 7 illustrates a second pole region spectrum that is measured at the same vehicle wheel 30 in the case of loosened wheel fastening means 34. As is evident from a comparison of FIGS. 6 and 7, spectral lines of the second pole region spectrum in accordance with FIG. 7 at frequencies that correspond to an integer multiple of the wheel frequency $f_{Wheel}$ multiplied by the number N of wheel fastening means 34 comprise a clearly higher amplitude than the corresponding spectral lines of the first pole region spectrum in accordance with FIG. 6. This applies in particular for 5 times or rather 10 times etc. the wheel frequency $f_{Wheel}$.

Figure 8:
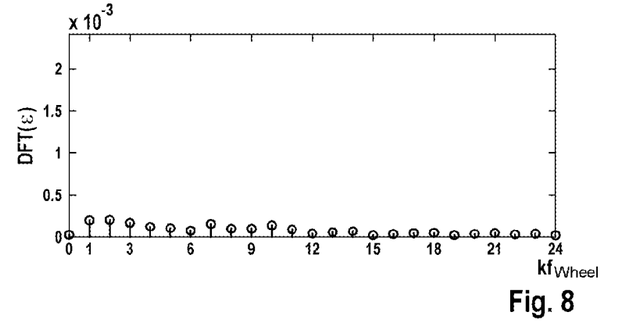
FIG. 8 illustrates a schematic illustration of a third pole region spectrum that was determined using the sensor arrangement in accordance with the disclosure from FIG. 1 at a vehicle wheel having three fixed wheel fastening means.
Figure 9:
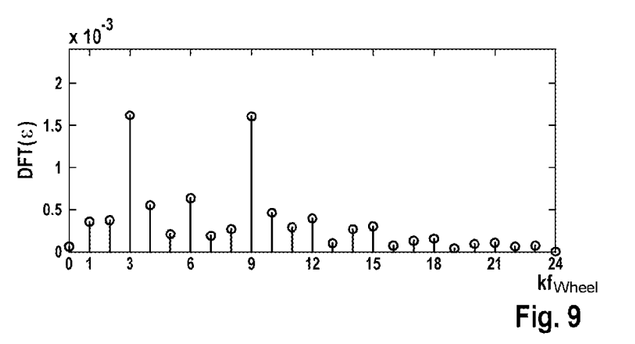
FIG. 9 illustrates a schematic illustration of a fourth pole region spectrum that was determined using the sensor arrangement in accordance with the disclosure from FIG. 1 at a vehicle wheel having three loosened wheel fastening means. The precontrol of further clamping locations takes place preferably likewise dynamically via a PT1 element with the same parameters P=1 and T=$I_{34}$/v. Of course, the precontrol can also take place using other elements e.g. PTn, DTn, ITn, dead-time elements, etc., or any desired combination thereof.

FIG. 8 illustrates in an exemplary manner a third pole region spectrum that was determined using the sensor arrangement in accordance with the disclosure at a vehicle wheel 30 having three fixed wheel fastening means 34. FIG. 9 illustrates a fourth pole region spectrum that is measured at the same vehicle wheel 30 in the case of loosened wheel fastening means 34. As is evident from comparing FIG. 8 and FIG. 9, spectral lines of the fourth pole region spectrum in accordance with FIG. 9 at frequencies that correspond to an integer multiple of the wheel frequency $f_{Wheel}$ multiplied by the number N of wheel fastening means 34 comprise a clearly higher amplitude than the corresponding spectral lines of the third pole region spectrum in accordance with FIG. 8. This applies in particular for 3 times or rather 6 times or rather 9 times etc. the wheel frequency $f_{Wheel}$.

The at least one evaluating and control unit 10, 100 determines the amplitudes of the spectral lines of the frequency spectrum of the periodic variation $\epsilon_i$ of the individual pulse duration $\Delta t_i$, the frequency of said spectral lines corresponding to an integer multiple of the wheel rotational speed ω or rather wheel frequency $f_{Wheel}$ multiplied by the number N of wheel fastening means 34. The at least one evaluating and control unit 10, 100 during the frequency analysis compares the determined amplitudes of the spectral lines with the predetermined threshold values and identifies loosened wheel fastening means 34 at the corresponding vehicle wheel 30 if the determined amplitudes of the spectral lines achieve and/or exceed the predetermined threshold values. Alternatively, detection can only occur at increased variation $\epsilon_i$ of the pole region pitch.

In addition or alternatively, the at least one evaluating and control unit 10, 100 uses the slippage effect and evaluates slippage that is determined from the wheel rotational speed signals so as to detect loosened wheel fastening means 34.

Figure 4:
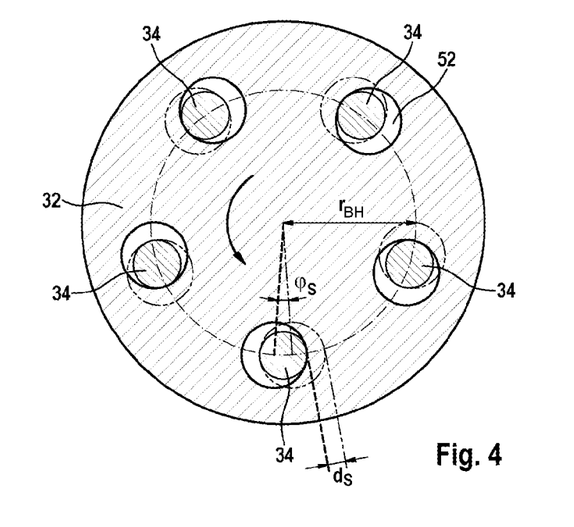
FIG. 4 illustrates a schematic plan view of a connecting region having five bolted connections between a wheel rim and a wheel hub so as to illustrate a mechanical slippage.
Figure 5:
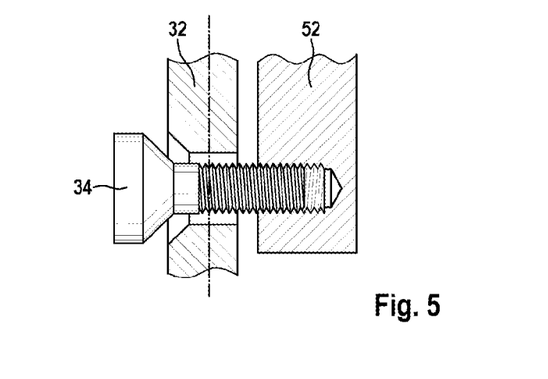
FIG. 5 illustrates a schematic cross sectional view of a bolted connection between the wheel rim and the wheel hub, said bolted connection being arranged in the connecting region in FIG. 8.

As is further evident in FIGS. 4 and 5, in load changing situations, in other words during the transition from an accelerating phase into a braking phase or rather motor braking phase or vice versa, slippage typically occurs between the wheel rim 32 and the wheel hub 52 in the case of loosened wheel fastening means 34. This slippage is dependent upon mechanical play $d_s$ between a corresponding wheel fastening means 34 and its through-going opening in the wheel rim 32. In the case of a given bolt hole radius $r_{BH}$, the theoretically possible slippage angle $\phi_s$ is calculated in radians as a quotient in accordance with equation (3).

$$\varphi_S = \frac{d_S}{r_{BH}} \qquad (3)$$

As is further evident in FIG. 4, the wheel bolts 34 are engaged at one hole side. In the case of a change in load, a change occurs to the other hole side that is illustrated by the dashed line. Typical values for the mechanical play $d_s$ lie in the region of 1 to 1.5 mm. The bolt hole radius $r_{BH}$ is dependent upon the vehicle and has a value of approximately 50 mm. Slippage angles $\phi_s$ in the magnitude of approximately 1° are to be expected.

Figure 10:
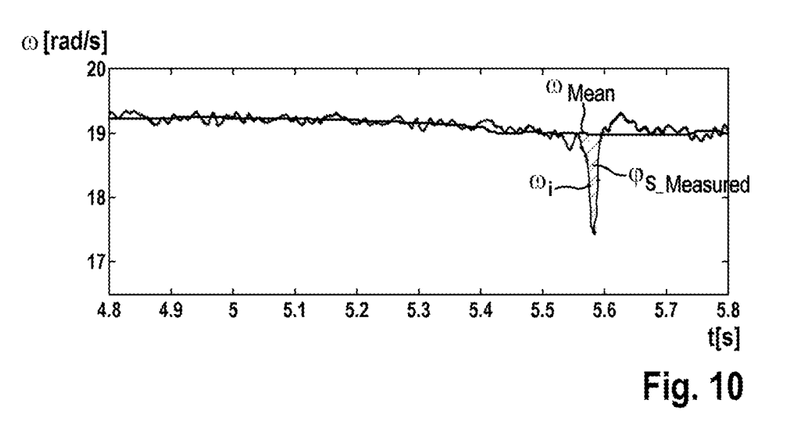
FIG. 10 illustrates a schematic characteristic curve diagram for illustrating an instantaneous wheel rotational speed and a mean wheel rotational speed that were determined using the sensor arrangement in accordance with the disclosure from FIG. 1 at a vehicle wheel.

As is evident in FIG. 10, the at least one evaluating and control unit 10, 100 in the illustrated exemplary embodiment determines the slippage angle $\phi_S$ from the measured wheel rotational speed signals ω, wherein the at least one evaluating and control unit 10, 100 calculates a short term integer $\phi_{S\_Measured}$ of a difference of instantaneous wheel rotational speed $\omega_i$ that is calculated from the individual pulse duration $\Delta t_i$, and the mean rotational speed $\omega_{Mean}$ that is calculated from the mean pulse duration ($\Delta t_{Mean}$) in accordance with equation (4).

$$\phi_{S\_Measured} = \int(\omega_i - \omega_{Mean})dt \qquad (4)$$

This corresponds approximately to the short term sum $\phi_{S\_Measured}$ in accordance with equation (5).

$$\varphi_{S\_Measured} \approx \sum \left( \frac{2\pi}{N \cdot \Delta t_i} - \frac{2\pi}{N \cdot \Delta t_{Mean}} \right) \cdot \Delta t_i \qquad (5)$$

or rather in accordance with the transformation of the weighted short term sum $\phi_{S\_Measured}$ over the variation $\epsilon_i$ in accordance with equation (6).

$$\varphi_{S\_Measured\_i} = -\frac{2\pi}{N} \sum_{k=0}^{4} \varepsilon_{i-k} \qquad (6)$$

The calculated slippage angle $\phi_S$ is signed, wherein the sign discloses whether the instantaneous wheel rotational speed $\omega_i$ has a value below or above the averaged wheel rotational speed $\omega_{Mean}$. During a transition from an accelerating phase into a braking phase, a lower instantaneous rotational speed $\omega_i$ is to be expected and in the case of a load change in the opposite direction, a higher instantaneous wheel rotational speed $\omega_i$ is to be expected.

It is therefore preferred that the weighted short term sum $\phi_{S\_Measured,i}$ that is continuously disclosed in equation (6) is formed over the variation $\epsilon_i$ so as to detect the slippage effect, by way of example over five neighboring pole regions 21.1. This can be implemented by way of example as an FIR-Filter (FIR: Finite Impulse Response) having the length 5, wherein all the filter coefficients comprise the value 1. The summation length of 5 comes from the expectation that the change from one side to another is typically completed within a rolling distance that corresponds to five pole regions 21.1 on the multipole disc 21 or rather approximately to a tenth of a wheel rotation. The evaluating and control unit 10, 100 evaluates the calculated slippage angle $\phi_S$ of the slippage that occurs so as to identify the mechanical play $d_s$ between the at least one vehicle wheel 30 or rather wheel rim 32 and the corresponding wheel hub 52 in load changing situations. The at least one evaluating and control unit 10, 100 identifies loosened wheel fastening means 34 at the corresponding vehicle wheel 30 if the value of the calculated slippage angle $\phi_S$ achieves a predetermined threshold value and/or is in a predetermined tolerance range around this threshold value. The repeated occurrence of measured slippage angles $\phi_{S\_Measured,i}$ that deviate slightly from the theoretical value $\phi_S$ during the load changing situation can likewise be used so as to detect loosened wheel fastening means 34.

Embodiments of the sensor arrangement in accordance with the disclosure for a vehicle 1 can be implemented in an advantageous manner without additional outlay on hardware in the ESP control device or ABS control device of each vehicle. It is possible in this manner for embodiments of the sensor arrangement in accordance with the disclosure to be used potentially in any vehicle such as for example passenger cars, heavy goods vehicles, motorbikes that comprise wheel rotational speed sensors at the wheels that are to be monitored.

The disclosure has been described using an example of magnetic rotational speed detecting devices that comprise multipole discs as encoder discs and magnetic field sensors so as to detect at least one state variable of a magnetic field. Clearly, it is also possible to use embodiments of the present disclosure also having rotational speed detecting devices that evaluate other physical variables, such as by way of example optical variables, so as to detect the rotational speed.

The invention claimed is:

1. A method of operating a sensor arrangement of a vehicle having at least one rotational speed detecting device, the method comprising:
receiving, with at least one evaluating and control unit, at least one state variable from the at least one rotational speed detecting device, the at least one rotational speed detecting device configured to (i) continuously detect at least one state variable and (ii) output the at least one state variable to the at least one evaluating and control unit, the at least one rotational speed detecting device including an encoder disc having a predetermined number of encoding regions and an allocated sensor, each encoding region being configured to generate in the allocated sensor a measuring pulse of the detected at least one state variable, each measuring pulse having an individual pulse duration;
determining, with the at least one evaluating and control unit, a rotational speed of at least one wheel of the vehicle based on the detected at least one state variable, the at least one wheel having a wheel rim fastened to a corresponding wheel hub by way of wheel fastening means;
determining, with the at least one evaluating and control unit, the individual pulse duration for each encoding region based on the detected at least one state variable;
determining, with the at least one evaluating and control unit, a mechanical play between the at least one wheel and the corresponding wheel hub based on the individual pulse duration;
identifying, with the at least one evaluating and control unit, loosened wheel fastening means based on the determined mechanical play; and
outputting, with the at least one evaluating and control unit, a warning signal in response to loosened wheel fastening means being identified.

2. The method as claimed in claim 1, further comprising:
calculating, with the at least one evaluating and control unit, a mean pulse duration over a rotation of the at least one wheel as a quotient derived from a sum of the determined individual pulse durations of the encoding regions and the predetermined number of the provided encoding regions,
wherein the mechanical play between the at least one wheel and the corresponding wheel hub is determined based on the individual pulse duration and the mean pulse duration.

3. The method as claimed in claim 2, further comprising:
determining, with the at least one evaluating and control unit, determine a periodic variation of the individual pulse durations over the wheel rotation, the determination of the mechanical play being further based on the periodic variation.

4. The method as claimed in claim 3, further comprising:
performing, with the at least one evaluating and control unit, a transformation of the periodic variation into a frequency domain using at least one of filtering and Fourier transformation, the determination of the mechanical play being further based on the transformation.

5. The method as claimed in claim 3, further comprising:
determining, with the at least one evaluating and control unit, amplitudes of spectral lines of a frequency spectrum of the periodic variation of the individual pulse duration, a frequency of the spectral lines corresponding to an integer multiple of a wheel rotational speed multiplied by a number of wheel fastening means, the determination of the mechanical play being further based on the amplitudes of the spectral lines.

6. The method as claimed in claim 5, further comprising:
comparing, with the at least one evaluating and control unit, the determined amplitudes of the spectral lines with predetermined threshold values, the identification of the loosened wheel fastening means being in response to the determined amplitudes at least one of equaling and exceeding the predetermined threshold values.

7. The method as claimed in claim 3, further comprising:
determining, with the at least one evaluating and control unit, a slippage angle of slippage that occurs in load changing situations between the at least one wheel and the corresponding wheel hub as a short term sum based on a difference between an instantaneous wheel rotational speed and a mean wheel rotational speed, the instantaneous wheel rotational speed being calculated from the individual pulse duration, the mean wheel rotational speed being calculated from at least one of the mean pulse duration and the short term sum by way of the periodic variation, the determination of the mechanical play being further based on an evaluation of the slippage angle.

8. The method as claimed in claim 7, wherein the further comprising:
identifying, with the at least one evaluating and control unit, of the loosened wheel fastening means in response to the value of the determined slippage angle being at least one of equal to a predetermined threshold value and within a predetermined tolerance range around the predetermined threshold value.

9. The method as claimed in claim 1, wherein the at least one rotational speed detecting device is embodied as at least one of a magnetic rotational speed detecting device and an optical rotational speed detecting device.

10. The method as claimed in claim 1, further comprising:
operating, with the at least one evaluating and control unit, an output device to provide the warning signal as at least one of an optical warning signal and an acoustic warning signal.

11. A sensor arrangement for a vehicle, the sensor arrangement comprising:
at least one evaluating and control unit; and
at least one rotational speed detecting device connected to the at least one evaluating and control unit and configured to (i) continuously detect at least one state variable and (ii) output the at least one state variable to the at least one evaluating and control unit, the at least one rotational speed detecting device including an encoder disc having a predetermined number of encoding regions and an allocated sensor, each encoding region being configured to generate in the allocated sensor a measuring pulse of the detected at least one state variable, each measuring pulse having an individual pulse duration,
wherein the at least one evaluating and control unit is configured to:
receive the at least one state variable from the at least one rotational speed detecting device;
determine a rotational speed of at least one wheel of the vehicle based on the detected at least one state variable, the at least one wheel having a wheel rim fastened to a corresponding wheel hub by way of wheel fastening means;
determine the individual pulse duration for each encoding region based on the detected at least one state variable;
determine a mechanical play between the at least one wheel and the corresponding wheel hub based on the individual pulse duration;
identify loosened wheel fastening means based on the determined mechanical play; and
output a warning signal in response to loosened wheel fastening means being identified.

12. The sensor arrangement as claimed in claim 11, wherein the at least one evaluating and control unit is configured to calculate a mean pulse duration over a rotation of the at least one wheel as a quotient derived from a sum of the determined individual pulse durations of the encoding regions and the predetermined number of the provided encoding regions,
wherein the mechanical play between the at least one wheel and the corresponding wheel hub is determined based on the individual pulse duration and the mean pulse duration.

13. The sensor arrangement as claimed in claim 12, wherein the at least one evaluating and control unit is configured to determine a periodic variation of the individual pulse durations over the wheel rotation, the determination of the mechanical play being further based on the periodic variation.

14. The sensor arrangement as claimed in claim 13, wherein the at least one evaluating and control unit is configured to perform a transformation of the periodic variation into a frequency domain using at least one of filtering and Fourier transformation, the determination of the mechanical play being further based on the transformation.

15. The sensor arrangement as claimed in claim 13, wherein the at least one evaluating and control unit is configured to determine amplitudes of spectral lines of a frequency spectrum of the periodic variation of the individual pulse duration, a frequency of the spectral lines corresponding to an integer multiple of a wheel rotational speed multiplied by a number of wheel fastening means, the determination of the mechanical play being further based on the amplitudes of the spectral lines.

16. The sensor arrangement as claimed in claim 15, wherein the at least one evaluating and control unit is configured to compare the determined amplitudes of the spectral lines with predetermined threshold values, the identification of the loosened wheel fastening means being in response to the determined amplitudes at least one of equaling and exceeding the predetermined threshold values.

17. The sensor arrangement as claimed in claim 13, wherein the at least one evaluating and control unit is configured to determine a slippage angle of slippage that occurs in load changing situations between the at least one wheel and the corresponding wheel hub as a short term sum based on a difference between an instantaneous wheel rotational speed and a mean wheel rotational speed, the instantaneous wheel rotational speed being calculated from the individual pulse duration, the mean wheel rotational speed being calculated from at least one of the mean pulse duration and the short term sum by way of the periodic variation, the determination of the mechanical play being further based on an evaluation of the slippage angle.

18. The sensor arrangement as claimed in claim 17, wherein the identification of the loosened wheel fastening means is in response to the value of the determined slippage angle being at least one of equal to a predetermined threshold value and within a predetermined tolerance range around the predetermined threshold value.

19. The sensor arrangement as claimed in claim 11, wherein the at least one rotational speed detecting device is embodied as at least one of a magnetic rotational speed detecting device and an optical rotational speed detecting device.

20. The sensor arrangement as claimed in claim 11, wherein the at least one evaluating and control unit has an output device is configured to provide the warning signal as at least one of an optical warning signal and an acoustic warning signal.

* * * * *

UNITED STATES PATENT AND TRADEMARK OFFICE
CERTIFICATE OF CORRECTION

PATENT NO. : 9,911,250 B2  
APPLICATION NO. : 14/899649  
DATED : March 6, 2018  
INVENTOR(S) : Steinlechner et al.

Page 1 of 1

It is certified that error appears in the above-identified patent and that said Letters Patent is hereby corrected as shown below:

In the Claims

In Column 10, Lines 55-56, Lines 1-2 of Claim 8 should read:
8. The method as claimed in claim 7, further comprising:

Signed and Sealed this
Twenty-fourth Day of July, 2018

Andrei Iancu
*Director of the United States Patent and Trademark Office*